4 Sheets—Sheet 1.

L. E. SUNDERLAND.

Assignor to the JOLIET ENTERPRISE COMPANY.

MACHINE FOR MAKING BARBED WIRE FENCE.

No. 10,597. Reissued May 12, 1885.

Witnesses:
Chas. E. Gaylord
Taylor E. Brown.

Inventor:
Leslie E. Sunderland
by Munday, Evarts & Adcock
his attys

4 Sheets—Sheet 2.

L. E. SUNDERLAND.

Assignor to the JOLIET ENTERPRISE COMPANY.

MACHINE FOR MAKING BARBED WIRE FENCE.

No. 10,597. Reissued May 12, 1885.

Witnesses:
Chas. E. Gaylord.
Taylor E. Brown

Inventor:
Leslie E. Sunderland
by Munday, Evarts and Adcock
his Attys

L. E. SUNDERLAND.

Assignor to the JOLIET ENTERPRISE COMPANY.

MACHINE FOR MAKING BARBED WIRE FENCE.

No. 10,597. Reissued May 12, 1885.

Witnesses:
Chas. E. Gaylord.
Taylor E. Brown

Inventor:
Leslie E. Sunderland
by Munday, Evarts & Adcock
his Attys

L. E. SUNDERLAND.

Assignor to the JOLIET ENTERPRISE COMPANY.

MACHINE FOR MAKING BARBED WIRE FENCE.

No. 10,597. Reissued May 12, 1885.

Witnesses:
Chas. E. Gaylord.
Taylor & Brown

Inventor:
Leslie E. Sunderland
by Munday, Evarts & Adcock
his Attys.

UNITED STATES PATENT OFFICE.

LESLIE E. SUNDERLAND, OF JOLIET, ILLINOIS, ASSIGNOR TO THE JOLIET ENTERPRISE COMPANY, OF SAME PLACE.

MACHINE FOR MAKING BARBED-WIRE FENCE.

SPECIFICATION forming part of Reissued Letters Patent No. 10,597, dated May 12, 1885.

Original No. 293,538, dated February 12, 1884. Application for reissue filed May 9, 1884.

*To all whom it may concern:*

Be it known that I, LESLIE E. SUNDERLAND, a citizen of the United States of America, residing at Joliet, in the county of Will and State of Illinois, have invented certain new and useful Improvements in Machines for Making Barbed Wire, of which the following is a specification, reference being had therein to the accompanying drawings.

Figure 1:
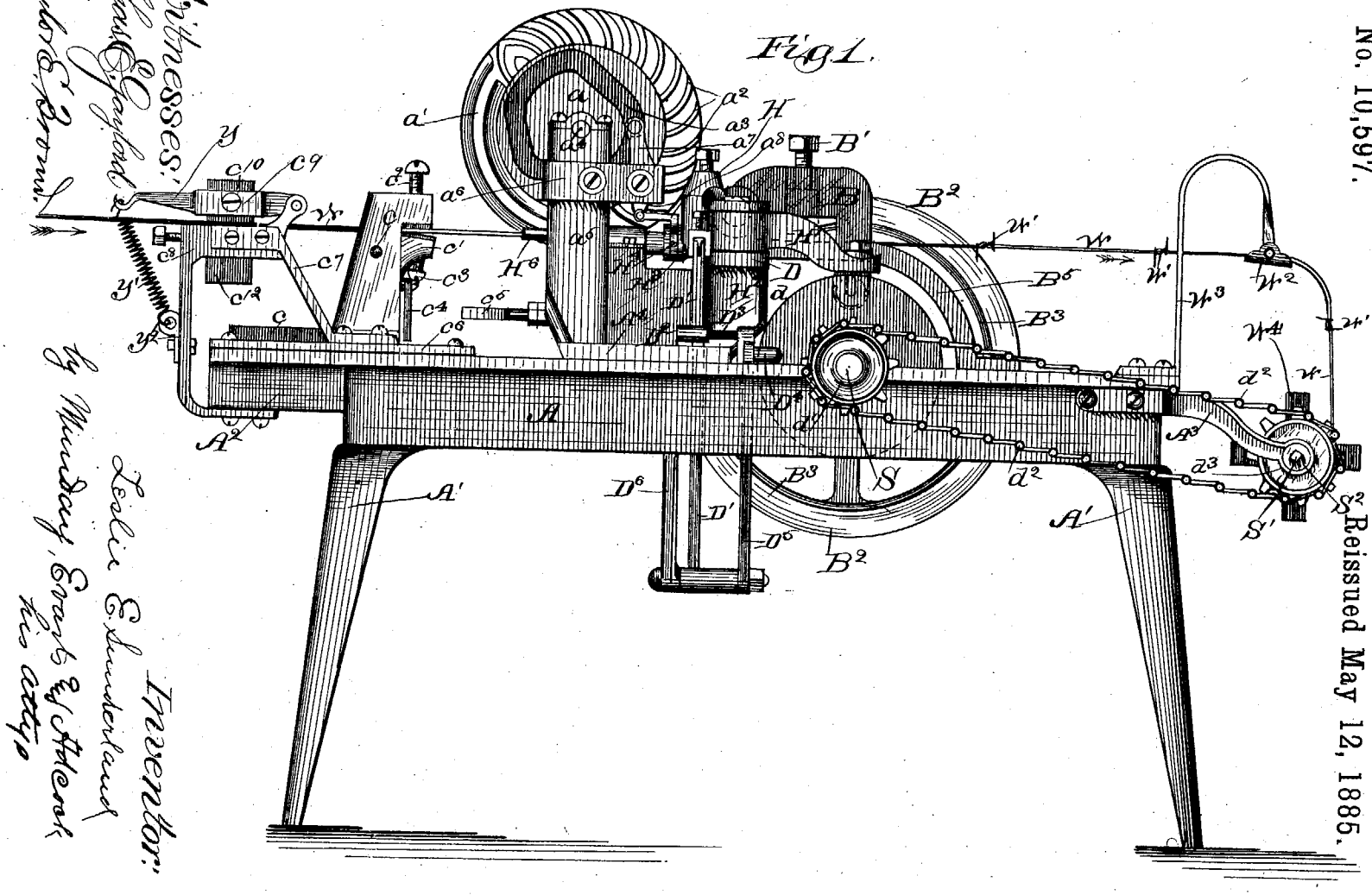
Figure 2:
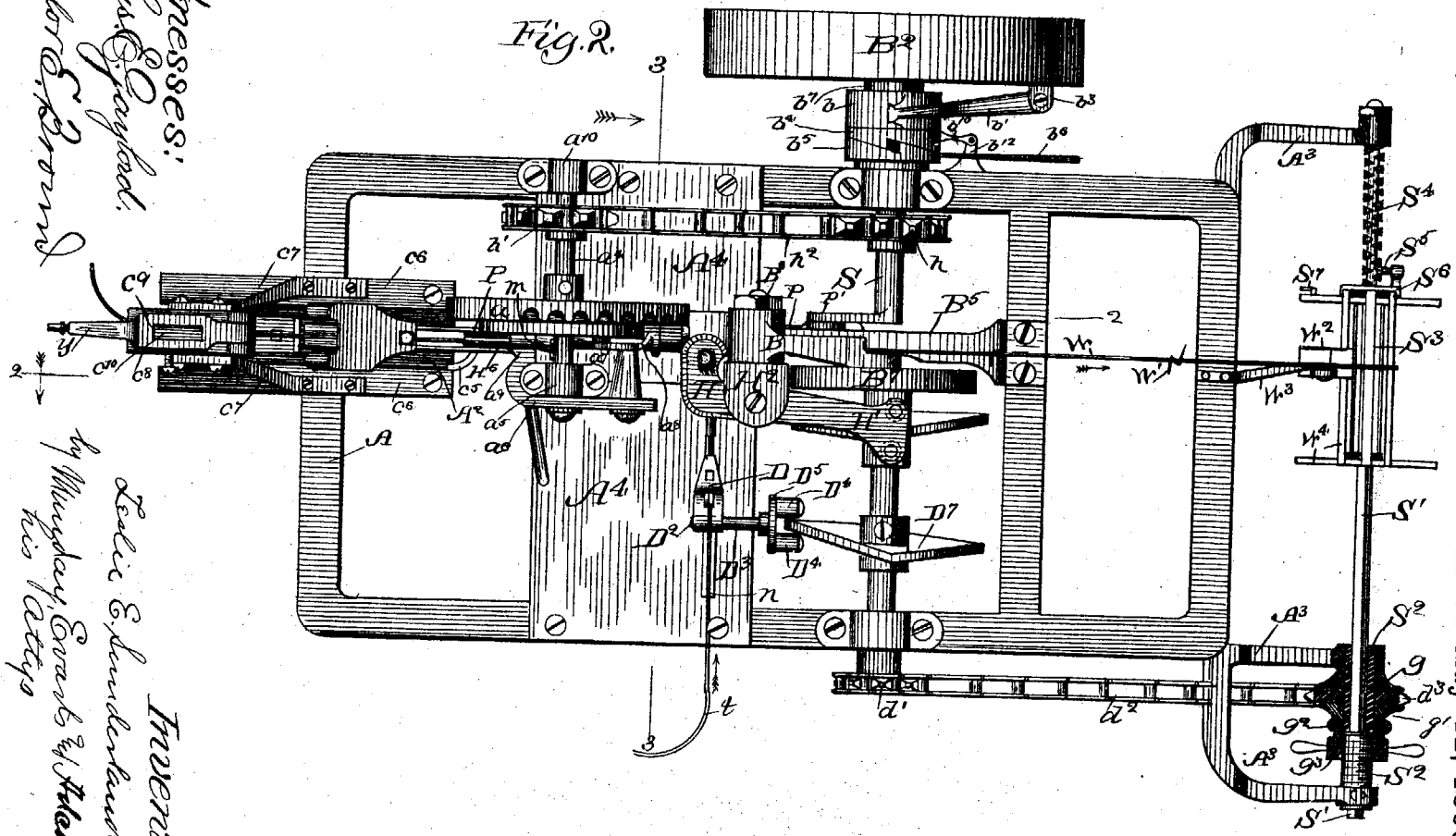
Figure 3:
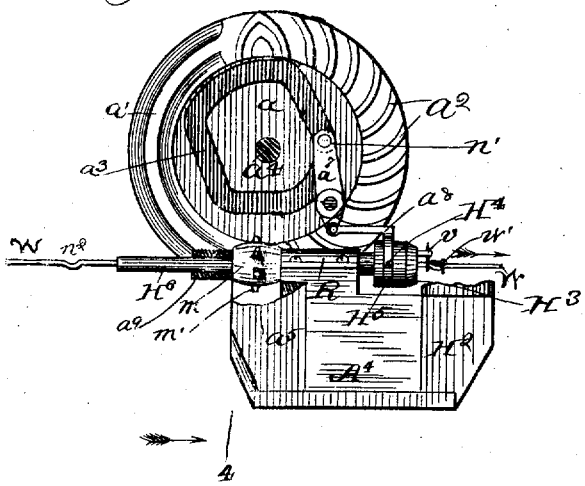
Figure 4:
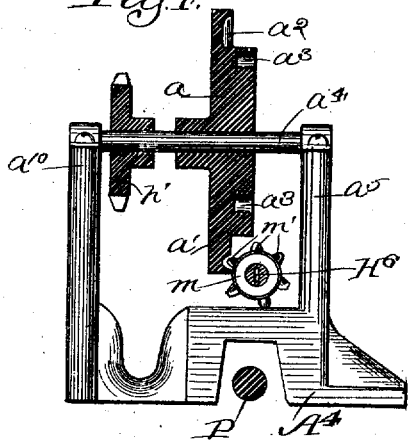
Figure 5:
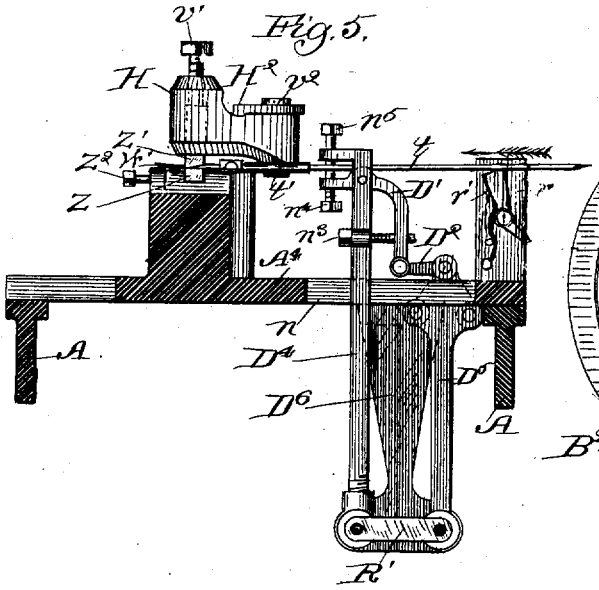
Figure 6:
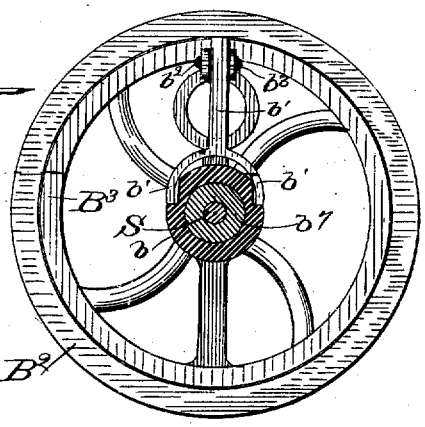
Figure 7:
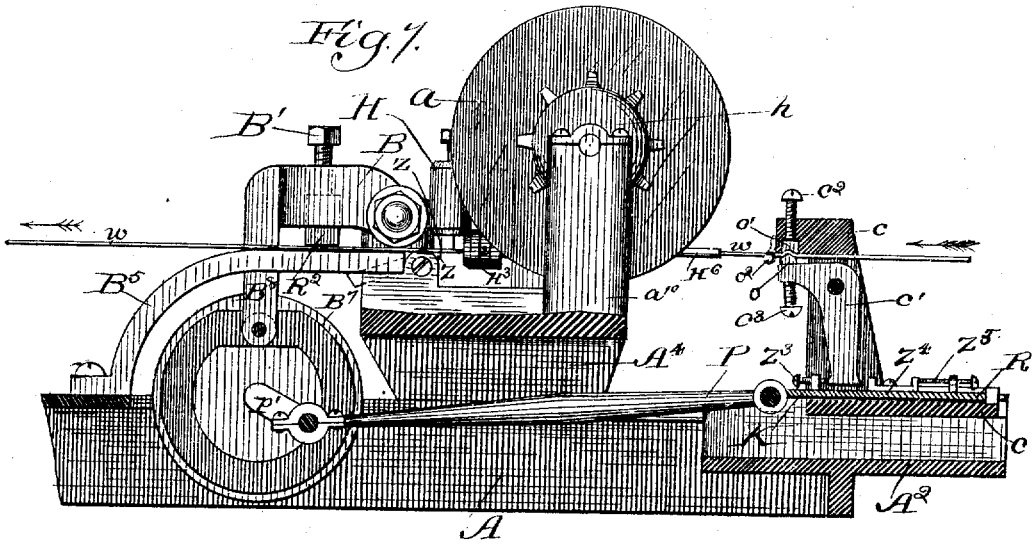
Figure 8:
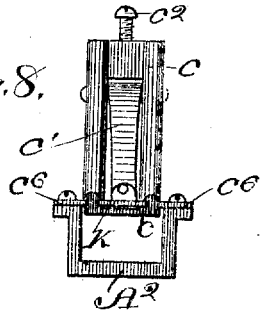
Figure 9:
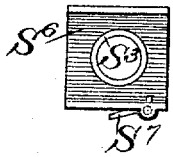
Figure 10:
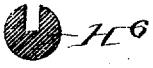
Figure 11:
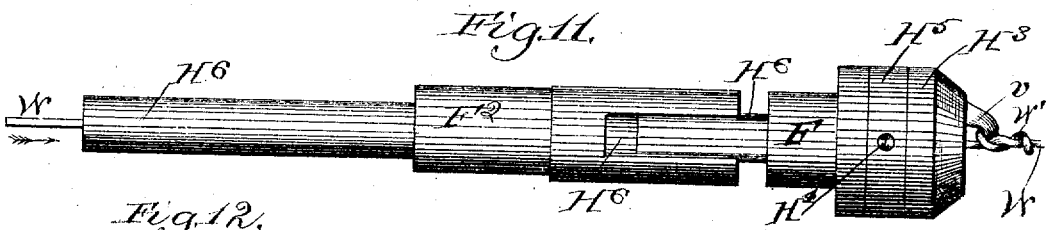
Figure 12:
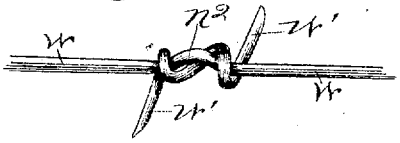

Figure 1 is a side elevation; Fig. 2, a plan view on the top; Fig. 3, a side view of the coiling-shaft and a front view of the cam-wheel that intermittently rotates it; Fig. 4, a cross-section on line 4 of Fig. 3; Fig. 5, a cross-section on lines 1 and 3 of Figs. 1 and 2, showing the barb-wire feed; Fig. 6, a side view of the drive-pulley; Fig. 7, a vertical section of a portion of Fig. 2 on line 2, looking in the direction of the arrow; Fig. 8, a rear view of the reciprocating head *c*, which feeds the strand-wire W in the machine; Fig. 9, a side view of the spool-clutch $S^6$ and cross-section of the hollow shaft $S^3$, to which it is attached; Fig. 10, a cross-section of the stem $H^6$, Fig. 11, through which the strand-wire is conducted through the coiler; Fig. 11, a side view of the coiling-shaft detached from the machine; Fig. 12, a perspective view of a finished barb, being the product of the machine; and Fig. 13, a side view of the coiling-shaft set in its boxes and having its reciprocating lever attached.

This machine is for the purpose of manufacturing barbed wire for fencing purposes—such as is shown in Fig. 12—formed of a single strand-wire having crimps at suitable intervals along its length, and having short pieces of wire, pointed at each end, coiled on the said crimps for barbs, as shown in said figure; and to this end my invention and my machine embodying the same consists, in connection with the coiling head or device for wrapping the barb about the fence-wire, of a pair of crimping jaws or dies to form the crimps or bends in the fence-wire.

Another feature of the invention consists in giving the crimping-jaws a longitudinal reciprocation or movement in the direction of the fence-wire, so that they will serve the additional function of feeding said fence-wire forward. This feature of the invention is of considerable advantage in the machine, owing to the very great accuracy required in the feed of the fence-wire in order to cause the cross or barb wire to properly register with the crimps formed in the fence-wire.

The invention also consists, in connection with the crimping-jaws and a feeding device for the barb-wire, of a guide or device to prevent the fence-wire rotating or turning about its own axis, so that the crimps therein may be always held and presented to the barb-wire in the same position.

It also consists, in connection with the crimping dies or jaws and the guide for holding the fence-wire from rotating after the crimps are formed therein, in giving the coiling-head a peculiar longitudinal movement while it is wrapping the barb about the fence-wire, so that one coil in the barb will be laid around the fence-wire at one extremity of the crimp, the middle portion of the barb wrapped spirally in the hollow of the crimp, and another coil in the barb formed at the other extremity or shoulder of the crimp.

It also consists in the particular devices and combination of devices I employ for giving the coiling-head its compound rotary and reciprocating motions.

The invention also consists in the novel devices and novel combinations of devices herein shown and described.

For the construction and operation of said machine reference is had to the accompanying drawings, in which a general side elevation is shown in Fig. 1, and a plan view on the top shown in Fig. 2, and the other figures illustrate different parts and views of said figures to render them more readily understood.

The working parts of the machine are supported on the main frame A, which stands on the legs A′. A centrally-located cross-shaft, S, (shown particularly in Fig. 2,) bears the main drive-pulley $B^2$ on its outer end, to which the power is applied, and has attached to it all the cams and cranks that drive the various parts of the machine. A sprocket-wheel, *d′*, is attached to the opposite end of said shaft S, and by means of the sprocket-chain $d^2$ drives the sprocket-wheel $d^3$ on the hollow shaft $S^2$, upon which the spool $W^4$ is placed to spool the finished barbed wire.

Through the hollow shaft $S^2$ passes the square shaft S′ through a square opening at the sprocket-wheel end, so that the said square shaft will rotate said hollow shaft, and at the same time permit it to slide along back and forth on said square shaft to carry the spool back and forth so the barbed wire will be distributed evenly over its surface.

The sprocket-wheel $h$ on shaft S drives sprocket-wheel $h'$ on shaft $a^4$ by means of the sprocket-chain $h^2$ to drive the wheel $a$ that rotates intermittingly the coiling-head $H^3$ by means of its meshing with the pinion $m$ on the part of the coiling-shaft marked $F^2$, as shown in Fig. 11.

The crank P′ on shaft S is connected by the pitman P to the sliding head K (shown more particularly in Fig. 7) to reciprocate the feed-jaws $c$ and $c'$, that grasp the strand-wire W between the dies $o$ and $o'$ and feed it forward into the machine, and at the same time crimp the wire between said dies in the form shown in Fig. 12.

The waved cam-wheel $H^7$ on the shaft S operates the die Z′, which, in connection with the stationary die Z, cuts off the barbing-wire as it is fed in between said dies, as shown in Fig. 5. The die Z′ is set in the head H, which is pivoted in the frame $H^2$ by the bolt $v^2$, and which head H terminates in the tail-piece H′, having at its outer end, on the under side, a pair of wrist-pins and friction-rollers, (shown by the dotted lines in Fig. 2,) between which the waved cam $H^7$ rotates to vibrate said tail-piece horizontally to operate said die Z′.

The cam $D^7$ on shaft S operates the feed device that feeds the barb-wire $t$ into the machine. This feed device is shown more particularly in Fig. 5, it being a cross-section on line 3 of Fig. 2, looking in the direction of the arrow. The waved cam $D^7$ rotates between the wrist-rollers $D^4$. (Shown in Fig. 2 and by the dotted lines in Fig. 5.) Looking at Fig. 5, this feed consists of the vertical arms D″ and $D^5$, which stand pivoted at the foot of the hanger $D^6$. These two arms are connected at the top by means of the link $D^2$ and bent lever D′, having the set-screw $n^4$ in its outer end. The arm D″ has its upper end terminate in an elbow to sustain the upper set-screw, $n^5$, directly over set-screw $n^4$, between which set-screws the barb-wire $t$ passes and is grasped to be fed forward. As cam $D^7$ rotates between the wrist-rollers $D^4$ the upper end of arm $D^5$ oscillates backward and forward, and by its connection with arm D″ oscillates that in the same manner. As they move forward toward the machine they cause the two set-screw dies $n^4$ $n^5$ to grasp the wire $t$ and drive it forward. The set-screw $n^3$ passes loosely through an opening through arm $D'^5$, and then screws into the lower side of lever D′. When arm $D^5$ moves backward, it will carry with it arm D″ as soon as the head of set-screw $n^3$ comes up in contact with arm D″. When set-screw $n^3$ is screwed out to its full length, arm $D^5$ will move some distance before it will move arm D″, and then move it only a short distance, and consequently shorten the stroke of said arm D″ and feed-dies $n^4$ $n^5$. A longer stroke of feed will be obtained by turning set-screw $n^3$ in, the length of the stroke of the feed being thus regulated by turning said set-screw in or out. The wire thus fed in forms the barb. The wire is prevented from being withdrawn by means of the spring-dog $r'$, pivoted at the side of the frame $r$, and held to its work by the spring $r^2$. The upper end of the frame $r$ overhangs the dog $r'$, so the wire can pass between said dog and said overhanging portion, as shown in Fig. 5.

The sprocket-chain $d^2$ drives the spool-shaft S′, which is a square rod that passes through a square opening through the length of the shaft $S^2$, which rotates in boxes in the frame $A^3$.

When it is desired to place a spool, $W^4$, on the shaft $S^3$, the shaft S′ is withdrawn and then passed back through the shaft $S^2$ and the spool $W^4$, as shown in Fig. 2. The sprocket-chain $d^2$ travels or rotates continuously and drives continuously the sprocket-wheel $d^3$ on shaft $S^2$, on which it loosely rotates.

The spool can only rotate intermittently to wind on it the finished wire, as the strand-wire must stop an instant each time a barb is placed on it, and for that reason the spool must stop long enough to permit the barb to be placed on and then rotate sufficiently to take up the wire until it is necessary to stop it to place another barb on it. In order to accomplish this, the sprocket-wheel $d^3$ on shaft $S^2$ is placed between two friction plates or disks, $g$ and $g'$, the disk $g$ being keyed to the shaft $S^2$, so that when it rotates it will rotate the said shaft with it.

The outer end of shaft $S^2$ is threaded, and a nut, $g^3$, having arms, by means of which it can be turned, is placed thereon, and between said nut and disk $g'$ is placed a rubber collar, $g^2$, and washer $g^4$, so that when the nut $g^3$ is turned up against said rubber collar it will cause the two disks $g$ and $g'$ to clamp the sprocket-wheel between them, and clamp it with sufficient force so it will, by frictional contact, rotate with them. Disk $g$ being keyed to $S^2$ rotates that with it, and also the square spool-shaft S′ upon which the spool is placed. The frictional contact of the disks $g$ and $g'$ is not so great but that the barbing part of the machine may hold the strand-wire still an instant to place on the barb; but it is intended the strand-wire will only pass through the machine intermittingly as fed in by the reciprocating feed $c$ and $c'$, and that the friction on sprocket-wheel $d^3$ will not overcome the tension on the said strand-wire at the opposite end of the machine, where it passes between the straightening-jaws $c^{10}$ $c^{12}$, so that by this means the spool may rotate intermittingly to take up the finished wire. The spool must be conveyed on shaft S′ and right-and-left screw $S^4$ back and forth to distribute the wire over its surface evenly. To accomplish this it is placed on a short hollow shaft, $S^3$, which has a square hole at one end to sleeve on shaft S'.

The right-and-left screw-shaft $S^4$ has its outer end firmly fixed in the frame $A^3$, and extends forward so its inner end meets shaft S' within the sleeved shaft $S^3$. This shaft $S^3$ has a head, $S^6$, integral therewith, with flanges, between which one of the arms of the spool lies, and is held therein by a latch, S'. (Shown in Fig. 9.) A switch, $S^5$, attached to said head S', runs in the screw $S^4$ and causes the spool to traverse said screw-shaft back and forth, for the purpose stated.

The operation of the machine is substantially as follows: The strand-wire W enters the machine at the left, looking at Figs. 1 and 2, and travels forward in the direction of the arrow. It first passes between a pair of die-plates, $c^{10}$ $c^{12}$, between which it draws to give tension to the wire as it is drawn through, and also to straighten out any kinks or bends there may be in it. The upper die-plate, $c^{10}$, is set in the arm $y$, pivoted at its inner end on the frame $c$, which is partially supported by the brace $c^7$, while its outer end is held down by the coil-spring $y'$, so as to cause the die-plate $c^{10}$ to press firmly on the strand-wire. The spring $y'$ may be adjusted by means of the sliding plate $y^2$ to give more or less tension on the arm $y$. A weight instead of said spring would answer the purpose as well. The wire W next passes into the feed, (shown more particularly in Fig. 7,) consisting of the reciprocating head $c$ and bell-crank jaw $c'$, furnished with a pair of dies, $o$ and $o'$, regulated by the set-screws $c^2$ $c^3$, and having their meeting-faces formed so that when they grasp the wire they will form a bend or crimp in it, such as is shown in Fig. 12. This reciprocating head is driven by the crank P' and pitman P, and traverses in the ways $c^5$ $c^6$. (Shown in Fig. 8.) The head $c$ is divided, as shown in its rear in Fig. 8, so the bell-crank jaw $c'$ can be pivoted between its two parts, as shown, and its lower end hangs down, so as to be between the set-screw $Z^3$ and the stop $Z^4$, made adjustable by the set-screw $Z^5$. The stop $Z^4$ and set-screw $Z^3$ are attached to a head, K, which reciprocates in ways within said reciprocating head $c$, and to which head the pitman P is attached, as shown in Fig. 7. When the pitman moves the head forward, it will cause the stop $Z^4$ to press against the lower end of the bell-crank jaw $c'$, and by that means move the sliding head $c$ forward. A reverse motion causes the set-screw $Z^1$ to come in contact with said jaw, and thus move the head $c$ backward. The set-screws $Z^3$ and $Z^5$ regulate the distance the head $c$ is to reciprocate, and thus regulate the distance apart the barbs are to be placed. A forward movement of the reciprocating head $c$ causes the wire W to be grasped between the dies $o$ and $o'$ and crimped and carried forward into the stem $H^6$, which is provided with a channel its entire length to conduct the wire and hold the crimp right side up or vertical at the place where the barb is placed on. This stem $H^6$ is shown in cross-section in Fig. 10, and extends entirely through the coiling-shaft $H^3$, of which Fig. 11 is an enlarged side view, and is also shown in Figs. 3 and 4. The part $F^2$ is the part upon which the pinion $m$, Fig. 3, is firmly keyed. The remaining portion between said pinion and the enlarged head end $H^3$ is inclosed within a box, R, and is jointed together, as shown in Fig. 11, so the large end $H^3$ may be reciprocated horizontally by means of the saddle $a^8$, pivoted to the ears $H^4$ on the opposite side of the annular ring $H^5$, that lies and turns in a corresponding annular channel in the coiling-head $H^3$. This saddle attaches to the lower end of lever $a^7$, pivoted near its center in the frame of the machine, while its upper end is provided with a roller-wrist that runs in the cam-channel $a^3$ of cam $a$, as shown in Fig. 3. This arrangement will give a reciprocating motion to the part F of said coiling-shaft and the head part $H^3$, having the coiling-hook $v$ on its outer end, so that when the coiling-hook $v$ begins to coil the barb on the strand-wire it will coil as it recedes, and thus give a long coil to the barb to make it cover the entire crimp in the strand-wire, as shown in Figs. 3, 11, and 12, instead of coiling it all in one place, as it would do if the coiling-pinion did not reciprocate. The stem $H^6$, as before stated, passes through the whole length of the coiling-shaft and is held stationary in the box $a^9$, as shown in Figs. 2 and 3, so it will not rotate or get out of place, and thus form a stationary permanent conductor of the wire W up to the coiling-hook $v$. The coiling-head $H^3$ rotates in one direction intermittingly, and only rotates when a barb is to be coiled on. Each feed of the strand-wire delivers a part of the strand-wire W, where it is crimped directly under the coiling-hook $v$, as shown in Figs. 3 and 11, and at the same instant the barb-wire $t$ is fed in far enough by the barb-feed (described and shown in Fig. 5) to make a single barb, and at the outer end of the crimp in the strand-wire from the coiling-hook $v$. The coiling-head $H^3$ and the shaft it is attached to then begin to rotate by means of the teeth $m'$ on the pinion $m$ running in the cam-channels $a^2$ on the face of the cam-wheel $a$, which causes the coiling-hook $v$ to catch the feed-in end of the barb and coil it on the strand-wire W on one of its crimps in the form shown in Fig. 12. The coiling-shaft then stops its rotation by means of one of the teeth of the pinion $m$ having run into the groove $a'$ on the face of the said cam-wheel. As soon as the coiling on of the barb is finished a wave in cam-wheel $H^7$ moves the tail-piece H' and head H containing the cutting-off die Z', Fig. 5, and cuts off the barb from the barb-wire in a diagonal direction, to leave sharp ends for prods. When the head $c$ and jaw $c'$ move forward, the spool takes up as much finished wire as is so fed forward by the said head $c$ and jaw $c'$. While the barb is being so coiled on the strand-wire the reciprocating head $c$ returns to perform another like operation. After a barb has thus been placed on the strand-wire it passes under a press to cause the prods of the barb to point in the proper direction and to straighten them. This press is shown in Figs. 1 and 7, and consists of the arm B, pivoted at $B^6$ to the standard $H^2$, while its other downwardly-extending end is provided with a roller-wrist to run in the cam-channel of cam-wheel $B^7$. The arm B is furnished with the adjustable die $R^2$, regulated vertically by the set-screw $B'$. The form of the cam-channel in cam-wheel $B^7$ will cause die $R^2$ to descend on a barb just at the time it passes under the said die to perform said service.

Figure 13:
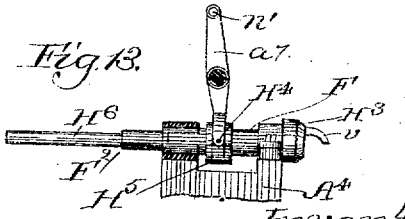

$B^5$ is a bed-plate over which the wire W passes, and between which and said die $R^2$ the barb is so pressed. When it ascends, it permits the barb to pass on. The finished barbed wire then passes onto the spool $W^4$ over the shoe-guide $W^2$, which is attached to the outer end of the spring-arm $W^3$, which is for the purpose of preventing a sudden jerk or jar to the spool. As the friction plates or disks heretofore described rotate the spool it draws down on the spring-arm $W^3$, which will give a strain to the wire W, and as said wire is fed forward said spring will ease the starting of the spool. The barbing-wire $t$ after it leaves jaws $n^5$ and $n^4$, Fig. 5, passes into the tube $t'$, which guides the wire into the cutting-off dies Z and $Z'$. The reciprocating head $c$ is provided with a roller, $o^2$, immediately in front of the dies $o$ and $o'$, over which the strand-wire passes, so as to hold it up and not let it drop when jaw $c'$ opens. The head $c$ is stopped in its forward movement by the stop $c^5$, which is intended to arrest the further movement forward by its engaging with spring $c^4$. (Shown in Fig. 1.) The coiling-shaft $H^3$ may have two boxes instead of one, and constructed as shown in Fig. 13, if desired. The drive-pulley $B^2$ is loose on shaft S, while the inner expansible rim, $B^3$, is integral with the hub $b^7$, which sleeves on over shaft S, and is firmly keyed thereto. The collars $b$, $b^4$, and $b^5$ are sleeved on said hub loosely. Collar $b^4$ has an outwardly-extending arm, $b^{10}$, which pivots, by means of the standard $b^{12}$, to the frame A, so it cannot rotate with said hub. The arm $b'$ is hinged between the meeting ends of the expansible rim $B^3$ by means of the ears $b^2$ $b^3$, Fig. 6, and its lower end is saddled over the collar $b$, so it will stand in steps on its sides. Collar $b^5$ has a lever attached to it, $b^6$, so it can be rotated partially on said hub $b^7$. Collars $b^4$ and $b^5$ are provided on their meeting faces with radial vertical offsets, as shown in Fig. 2, so that when collar $b^5$ is partially rotated it will press collar $b^4$ over against collar $b$, the effect of which is to press upwardly on arm $b'$, and thus expand the rim $B^3$, so that it will have frictional contact with the inner side of the rim of pulley $B^2$, and by such contact be driven or rotated by pulley $B^2$, and with it the main shaft S, that drives the machine.

In order to operate the barbing part of this machine, it is absolutely necessary that a spooling device should be used in connection with it to take up the finished barbed wire and draw the strand-wires in and through the machine. For that reason a spooling device is shown and described; but any other suitable spooling apparatus may be used as well as the one shown.

I claim—

1. In a barb-fence machine, the combination, with a pair of dies for forming crimps in the fence-wire, of a coiling-head for wrapping the barb about the fence-wire at such crimps, substantially as specified.

2. In a barb-fence machine, the combination, with a pair of reciprocating dies for forming crimps in the fence-wire and feeding said fence-wire forward, of a coiling-head for wrapping the barbs about the fence-wire at such crimps, substantially as specified.

3. The combination of a pair of dies for forming crimps in a fence-wire, a coiling-head for wrapping the barbs about the fence-wire at such crimps, and a guide for the fence-wire to prevent the same from rotating, substantially as specified.

4. The combination, with a pair of reciprocating crimping-dies to form crimps in the fence-wire and feed the same forward, of a guide to prevent the fence-wire revolving, a barb-wire-feeding device, and a coiling-head to wrap the barb about the fence-wire at the crimps therein, substantially as specified.

5. The combination of a pair of crimping-dies to form crimps in the fence-wire and a reciprocating coiling-head for wrapping the barbs about the fence-wire at such crimps, substantially as specified.

6. In a barb-fence machine, the combination, with the reciprocating crimping-dies to form crimps in the fence-wire and feed the same forward, of a receiving-spool and a spring take-up for the barb-wire located between said spool and said crimping-dies, substantially as specified.

7. In a wire-barbing machine, the combination of the shaft S, crank $P'$, pitman P, reciprocating head K, having the adjustable stop $Z^4$, and set-screws $Z^3$ $Z^5$, reciprocating head $c$, having the bell-crank jaw $c'$, crimping-dies $o$ $o'$, set-screws $c^2$ $c^3$, and supporting-roller $o^2$, straightening-plates $c^{10}$ $c^{12}$, stem $H^6$, and coiling-shaft $H^3$, having the coiling-hook $v$, and adapted to reciprocate and rotate, as and for the purpose set forth.

8. In a wire-barbing machine, the combination of the shaft S, sprocket-wheel $h$, sprocket-chain $h^2$, sprocket-wheel $h'$, shaft $a^4$, cam-wheel $a$, having the cam-channels $a'$ $a^2$ $a^3$, lever $a^7$, having the roller-wrist $n'$, saddle $a^8$, annular ring $H^5$, having the two ears or pins $H^4$, coiling-shaft $H^3$, having the coiling-hook $v$, and adapted to reciprocate and rotate its coiling end simultaneously, pinion $m$, and stem $H^6$, as and for the purpose set forth.

9. In a wire-barbing machine, the combination of shaft S, waved cam-wheel $D^7$, wrist-rollers $D^4$ $D^4$, arms $D^5$ and $D''$, hanger $D^6$, link $D^2$, lever $D'$, set-screw dies $n^4$ $n^5$, set-screw $n^3$, dog $r'$, spring $r^2$, standard $r$, and guide-tube $t'$, as and for the purpose set forth.

10. In the wire-barbing machine described, the combination of the shaft S, waved cam $H^7$, lever $H'$, having the head H, standard $H^2$, cutting-off dies Z and $Z'$, set-screws $v'$ and $Z^2$, and bed-plate $A^4$, as and for the purpose set forth.

11. In a wire-barbing machine, the combination of the shaft S, cam-wheel $B^7$, arm $B^8$, having the roller-wrists to run in the cam-channel of said cam, head B, pivoted to standard $H^2$, bed-plate $B^5$, die $R^2$, and set-screw $B'$, as and for the purpose set forth.

12. In a wire-barbing machine, the combination of the cam-wheel $a$, lever $a^7$, saddle-link $a^8$, annular ring $H^5$, and pinion $m$, adapted to rotate and reciprocate the coiling end of the coiling-shaft $H^3$ simultaneously, as and for the purpose set forth.

13. In a wire-barbing machine, the combination of the reciprocating head $c$, dies $o$ and $o'$, and supporting-roller $o^2$, as and for the purpose set forth.

14. In the wire-barbing machine described, the combination of the straightening-plates $c^{10}$ $c^{12}$, strand-wire feed consisting of the reciprocating head $c$ and bell-crank jaw $c'$, and dies $o$ and $o'$, operated by the mechanism described, coiling-shaft $H^3$, having the coiling-hook $v$, and adapted to reciprocate and rotate its coiling end simultaneously by the mechanism described, cutting-off dies Z $Z'$ and their operating mechanism, barb-wire feed described and illustrated particularly in Fig. 5, press B, having the die-press $R^2$ and operated as described, guide-shoe $W'$, and spring-standard $W^3$, all adapted to operate as and for the purpose set forth.

LESLIE E. SUNDERLAND.

Witnesses:

PORTER HEDGE,

CHAS. PHELPS.